United States Patent [19]
Hölle et al.

[11] Patent Number: 4,677,173
[45] Date of Patent: Jun. 30, 1987

[54] PROCESS FOR THE PRODUCTION OF SUSPENSION POLYMERIZATES

[75] Inventors: Hans-Joachim Hölle, Rodenbach; Gerhard Morlock, Hanau, both of Fed. Rep. of Germany

[73] Assignee: Degussa AG, Frankfurt am Main, Fed. Rep. of Germany

[21] Appl. No.: 822,591

[22] Filed: Jan. 27, 1986

[30] Foreign Application Priority Data

Feb. 2, 1985 [DE] Fed. Rep. of Germany ....... 3503584

[51] Int. Cl.$^4$ ............................................. C08F 2/18
[52] U.S. Cl. .................................. 526/193; 526/909
[58] Field of Search .......................................... 526/193

[56] References Cited

U.S. PATENT DOCUMENTS 4,306,048 12/1981 Yoshida ............................... 526/193
4,535,137 8/1985 Siol ...................................... 526/216

Primary Examiner—Christopher Henderson
Attorney, Agent, or Firm—Cushman, Darby & Cushman

[57] ABSTRACT

The suspension polymerization of acrylic acid esters, methacrylic acid esters and vinyl aromatics alone or in admixture with subordinate amounts of other monomers is carried out in the presence of an acrylic or methacrylic acid homo or polymerizate or its alkali metal or ammonium salts as dispersing agent with the addition of an acid ester of phosphoric acid with an alkanol having 1 to 8 carbon atoms. The size of polymerizate beads produced is influenced by this procedure.

10 Claims, No Drawings

PROCESS FOR THE PRODUCTION OF SUSPENSION POLYMERIZATES

BACKGROUND OF THE INVENTION

The invention is directed to a process for the production of suspension polymerizates by polymerization of esters of acrylic acid or methacrylic acid or vinyl aromatics, or monomer mixtures which predominantly consist of such monomers, in aqueous suspension and in the presence of a homopolymerizate of acrylic acid or methacrylic acid or a copolymerizate which is derived from at least 50 percent by weight of acrylic acid or methacrylic acid, in the form of the free acid or its alkali metal (e.g. sodium or potassium) or ammonium salt.

The suspension polymerization of esters of acrylic acid or methacrylic acid or vinyl aromatics or monomer mixtures which predominantly consist of such monomers is basically known.

It is also known to use as dispersing agents in such polymerization homopolymers of acrylic acid or methacrylic acid or copolymerizates which are derived from at least 50 percent by weight of these acids. These polymerizates can be used in the form of the free acids or as alkali metal or ammonium salts. They have the advantage that they are generally easy to remove through washing the polymerizate beads which are formed. However, less satisfactory is the fact that the customary procedures for controlling the average size of the beads, such as variations in the number of revolutions per minute of the stirrer and/or the amount of dispersing agent have little effect in using these polymerizates. Especially it is difficult to produce relatively large beads (average diameter about 0.3 to 1 mm), since with too great a reduction of the speed of rotation of the stirrer and/or the amount of dispersing agent the stability of the suspension is no longer guaranteed.

However, the formation of relatively coarse beads is frequently very desirable because they are easier to separate from the aqueous suspension than fine beads and as a rule because of their lower specific surface area contain less impurities.

SUMMARY OF THE INVENTION

The invention is directed to a process of the type just described which is modified by carrying out the polymerization with the addition of 0.004 to 0.2 weight percent, based on the water present in the polymerization system, of at least one mono or diester of phosphoric acid with an alcohol having 1 to 8 carbon atoms.

Examples of such esters are monomethyl phosphate, dimethyl phosphate, monoethyl phosphate, diethyl phosphate, monopropyl phosphate, dipropyl phosphate, monoisopropyl phosphate, diisopropyl phosphate, mono-n-butyl phosphate, di-n-butyl phosphate, mono-sec-butyl phosphate, di-sec-butyl phosphate, mono-n-amyl phosphate, di-n-amyl phosphate, mono-n-hexyl phosphate, di-n-hexyl phosphate, mono methyl mono ethyl phosphate, mono-n-octyl phosphate, di-n-octyl phosphate, mono-2-ethylhexyl phosphate, di-2-ethylhexyl phosphate, mono-isooctyl phosphate, and disooctyl phosphate.

Preferably, the phosphoric acid ester is employed in an amount of 0.02 to 0.08 weight percent. The alcohol group can be straight or, if it contains at least 3 carbon atoms, it can also be branched. In the case of the diester both alcohol groups can be the same or different from each other. However, it is naturally more suitable if they are the same.

Furthermore, there are preferably employed phosphoric acid esters with alkanols having 2 to 6 carbon atoms. Especialy preferred is a mixture of 20 to 80 weight percent mono-n-butyl phosphate and 80 to 20 weight percent di-n-butyl phosphate.

The phosphoric acid ester is suitably added to the water phase, however, in principle it can also be added to the monomer phase. Although its addition takes place only in a relatively small amount, nevertheless it has a very pronounced effect on the average size of the polymerizate beads formed. In general it is true that the polymerizate beads are coarser with increasing amount of added phosphoric acid ester. Besides it has been observed that as a rule under otherwise equal conditions, a smaller addition of a phosphoric acid ester with an alcohol having a larger number of carbon atoms has a similar effect to that of a larger addition of a phosphoric acid ester with an alcohol having fewer carbon atoms.

Frequently the addition of the phosphoric acid esters of the invention has the further advantage that the polymerizate beads formed have an improved pourability or flowability because of the reduced electrostatic charge.

The process of the invention is basically suitable for the polymerization of all monomers and mixtures of monomers from the group of (meth) acrylic acid esters and/or vinyl aromatics which are customarily polymerized in suspension. Suitably the monomers should be selected such that the polymerizate formed has a glass transition temperature of at least 30° C. in order to avoid sticking of the polymerizate beads formed.

Suitable monomers above all are esters of acrylic acid and methacrylic acid with monohydric alcohols, especially those having 1 to 16 or even 18 carbon atoms such as methyl methacrylate, ethyl methacrylate, n-butyl methacrylate, isobutyl methacrylate, 2-ethylhexyl methacrylate, lauryl methacrylate, stearyl methacrylate, methyl acrylate, ethyl acrylate, n-butyl acrylate, tert.butyl acrylate, 2-ethylhexyl acrylate or lauryl acrylate and vinyl aromatics such as styrene, vinyl toluene, e.g. p-vinyl toluene, o-vinyl toluene, p-tert.butyl styrene or α-methyl styrene.

Thus also suitable as components of the monomer mixtures are monomers having further functional groups such as e.g. α, β-unsaturated mono or dicarboxylic acids, for example acrylic acid, methacrylic acid or itaconic acid; esters of acrylic acid or methacrylic acid with dihydric alcohols, for examples hydroxyethyl acrylate, hydroxyethyl methacrylate, hydroxypropyl acrylate, or hydroxypropyl methacrylate; acrylamide or methacrylamide; dimethylaminoethyl acrylate or dimethylaminoethyl methacrylate. Because of their water solubility the portion of these monomers in each mixture suitably should be limited to a maximum of about 10 weight percent. Further suitable components of the monomer mixtures are for example glycidyl acrylate or glycidyl methacrylate.

As dispersing agents there can be used homopolymerizates of acrylic acid or methacrylic acid or copolymerizates which contain at least 50 weight percent of these acids and in addition contain up to 50 weight percent of building units which originate from monomers copolymerizable with acrylic acid or methacrylic acid, especially methyl methacrylate. Insofar as these polymerizates are soluble in water to a sufficient degree they are preferably employed in the form of the free acid. However, if necessary they can also be used in the form of their alkali metal (e.g. sodium or potassium) or ammonium salts. Especially suitable dispersing agents are those polymerizates which in a 10 weight percent aqueous solution have a dynamic viscosity measured at room temperature between 80 and 2,000 mPas or which as alkali metal or ammonium salt in a 6 weight percent aqueous solution have a dynamic viscosity measured at room temperature between 200 and 10,000 mPas. These dispersing agents are suitably used in an amount of 0.05 to 1 weight percent, especially 0.1 to 0.4 weight percent, based on the water present in the polymerization system. They are advantageously kept in supply as 5 to 30 weight percent aqueous solutions and added in this form to the water phase.

In addition to the dispersing agent the water phase naturally can also contain further additives conventionally employed in suspension polymerizations, for example acids or acid salts to regulate the pH, such as sulfuric acid or potassium bisulfate, buffer salts such as disodium hydrogen phosphate or sodium dihydrogen phosphate; or neutral salts for pushing back the solubility of water soluble monomers, such as sodium sulfate.

As polymerization initiators, which as a rule are added to the monomer phase, there can be used the customarily employed radical initiators, especialy peroxide or azo compounds with decomposition temperatures below 120° C. Sometimes it can be advantageous to employ a mixture of different initiators. The amount added generally is in the range between 0.1 and 5 weight percent based on the monomer phase. Suitable initiators for examples are octanoyl peroxide, decanoyl peroxide, lauroyl peroxide, benzoyl peroxide, monochlorobenzoyl peroxide, dichlorobenzoyl peroxide, p-methylbenzoyl peroxide, tert.butyl perpivalate, tert.butyl peroctoate, tert.butyl perbenzoate, azobisisobutyronitrile or azobis-(2,4-dimethyl)-valeronitrile.

To regulate the molecular weight of the polymer formed there can also be added to the monomer phase in customary manner up to 8 weight percent of one or more known chain regulators. For example, there can be mentioned: mercaptans, such as n-butyl mercaptan, n-octyl mercaptan, n-dodecyl mercaptan, or tert.dodecyl mercaptan; thioglycolic acid esters, such as isoctyl thioglycolate or lauryl thioglycolate; aliphatic chlorine containing compounds; enol ethers or α-methyl styrene dimer.

In the event that cross-linked polymerizates are to be produced the monomer phase can also contain up to about 10 weight percent of multifunctional monomers, for example ethylene glycol diacrylate, ethylene glycol dimethacrylate, butanediol diacrylate, butanediol dimethacrylate or divinyl benzene.

Basically the process of the invention can be carried out in the customary manner for suspension polymerization. In an illustrative discontinuous form for example, the water phase, which already contains the dispersing agent, the phosphoric acid ester or esters and optionally other customary additives, is already present in a suitable polymerization vessel and there is added with stirring the monomer phase which as a rule already contains the monomer soluble additives, such as initiators, chain regulators, or lubricant. The air oxygen contained in the polymerization system is suitably removed by evacuation and pressuring with nitrogen. The polymerization is started by heating the mixture.

The monomer/water ratio as a rule is between 1:4 and 1:1. The polymerization temperature customarily is between about 60° and 120° C. Depending on the monomer/water ratio used, the polymerization is carried out adiabatically or under at least partial removal of the heat of polymerization by cooling.

After the end of the polymerization the mixture is cooled and the polymerizate beads formed are separated off by filtration or centrifugation. Suitably they are washed either on a filter or in a centrifuge. Subsequently they are dried in a suitable drier, for example in a drying oven or in a fluidized bed drier.

The invention is explained in more detail in the following examples and comparison experiments. All percentages are by weight. There was determined on the polymerizate beads according to the Rosin-Rammler-Sperling plotting the statistical particle diameter d' (for 36.8% sieve residue) and the uniformity coefficient n.

The process can comprise, consist essentially of, or consist of the stated steps with the recited materials.

EXAMPLE 1

There was present in a 5 liter polymerization vessel equipped with stirrer, reflux condenser, and thermometer a mixture of 3,150 grams of completely salt free water, 48 grams of a 10% aqueous polyacrylic acid solution having a dynamic viscosity of 300 mPas, 1 gram of mono-n-butyl phosphate and 1 gram of di-n-butyl phosphate and the mixture heated to 70° C. There were then with stirring added 1,600 grams of a mixture of 50 parts by weight methyl methacrylate, 49 parts by weight n-butyl methacrylate, 1 part by weight methacrylic acid, 0.7 parts by weight n-dodecyl mercaptan and 0.6 parts by weight dilauroyl peroxide. The mixture was stirred for 3 hours in a water bath at 75° C. and then cooled to room temperature. The polymerizate beads were filtered off, thoroughly washed with completely salt free water and dried in a fluidized bed drier at a supply air temperature of 70° C. There were obtained 1,585 grams of agglomerate free polymerizate beads having a statistical particle diameter d' of 0.80 mm and a uniformity constant n of 5. The beads are characterized by high brilliance, uniform spherical structure and good pourability. A 30 percent solution in xylene was completely clear.

EXAMPLE 2

Example 1 was repeated with the sole difference that there was employed only 0.5 gram of each of the phosphoric acid esters.

There were obtained 1,570 grams of agglomerate free polymerizate beads having a statistical particle diameter d' of 0.45 mm and a uniformity coefficient n of 5. The beads are likewise characterized by high brilliance and uniform shape. A 30 percent solution in xylene was likewise completely clear.

COMPARISON EXPERIMENT A

Example 1 was repeated but there was omitted the addition of any phosphoric acid ester.

The filtration of the polymerizate beads formed clearly proceeded much slower than in Examples 1 and 2. There were obtained 1,540 grams of polymerizate beads having a statistical particle diameter d' of 0.20 mm and a uniformity coefficient n of 4. A 30 percent solution in xylene showed a slight turbidity.

EXAMPLE 3

There was present in a 5 liter polymerization vessel equipped with stirrer, reflux condenser and thermometer a mixture of 3,130 grams of completely salt free water, 64 grams of a 10 percent aqueous polyacrylic acid solution having a dynamic viscosity of 300 mPas, 0.65 gram mono-n-butyl phosphate and 0.65 gram di-n-butyl phosphate and the mixture heated to 70° C. There added with stirring 1,600 grams of a mixture of 100 parts by weight isobutyl methacrylate, 0.8 parts by weight n-dodecyl mercaptan and 0.8 parts by weight dilauroyl peroxide. The mixture was stirred for 3 hours in a water bath having a temperature of 75° C. and then cooled to room temperature. The polymerizate beads were filtered off, thoroughly washed with completely salt free water and dried in a fluidized bed drier at a supply air temperature of 60° C. There were obtained 1,576 grams of agglomerate free polymerizate beads having a statistical particle diamter $d'$ of 0.50 mm and a uniformity coefficient n of 5. The beads are characterized by a high brilliance and purity. A 30 percent solution in xylene was completely clear.

COMPARISON EXAMPLE B

Example 3 was repeated but without addition of any phosphoric acid ester.

The filtration of the polymerizate beads formed clearly proceeded slower than in Example 3. There were obtained 1,556 grams of polymerizate beads having a statistical particle diameter $d'$ of 0.15 mm and a uniformity coefficient n of 4.5. A 30 percent solution in xylene showed a slight turbidity.

EXAMPLE 4

There were present in a 5 liter polymerization vessel equipped with stirrer reflux condenser and thermometer a mixture of 2,740 grams of completely salt free water, 140 grams of a 6 percent aqueous solution of a copolymerizate made of 60% methacrylic acid and 40% methyl methacrylate in the form of the sodium salt having a dynamic viscosity of 1,400 mPas and 0.14 gram of mono-n-octyl phosphate and the mixture heated to 70° C. There were then added with stirring 1,920 grams of a mixture of 100 parts by weight methyl methacrylate, 0.1 parts by weight n-dodecyl mercaptan and 0.5 parts by weight dilauroyl peroxide. The mixture was stirred for 3 hours in a water bath at 75° C. and then cooled to 60° C. The polymerizate beads were centrifuged off at this temperature, thoroughly washed with completely salt free water and dried in a fluidized bed drier at a supply air temperature of 90° C. There were obtained 1,905 grams of clear, essentially agglomerate free and readily pourable polymerizate beads having a statistical particle diameter $d'$ of 0.35 mm and a uniformity coefficient n of 4.5.

EXAMPLE 5

There were present in a 5 liter polymerization vessel equipped with stirrer, reflux condenser and thermometer a mixture of 3,080 grams of completely salt free water, 128 grams of a 10 percent aqueous polyacrylic acid solution having a dynamic viscosity of 30 mPas and 0.32 gram of diethyl phosphate and the mixture heated to 70° C. There were then added with stirring 1,600 grams of a mixture of 85 parts by weight methyl methacrylate, 12 parts by weight ethyl acrylate, 3 parts by weight methacrylic acid, 0.2 parts by weight isooctyl thioglycolate and 0.6 parts by weight dilauroxyl peroxide. The mixture was stirred for 3 hours in a water bath having a temperature of 70° C. and then cooled to 60° C. The polymerizate beads were centrifuged off at this temperature, thoroughly washed with completely salt free water and dried in a fluidized bed drier at a supply air temperature of 90° C. There were obtained 1,585 grams of clear essentially agglomerate free and readily pourable polymerizate beads having a statistical particle diameter $d'$ of 0.40 mm and an uniformity coefficient n of 4.5.

EXAMPLE 6

There were present in a 5 liter polymerization vessel equipped with stirrer, reflux condenser and thermometer, a mixture of 3,080 grams of completely salt free water, 128 grams of a 10 percent aqueous polyacrylic acid solution having a dynamic viscosity of 300 mPas and 3.2 grams of dimethyl phosphate and the mixture heated to 70° C. Then there were added with stirring 1,600 grams of a mixture of 20 parts by weight of n-butyl methacrylate, 80 parts by weight styrene and 1 part by weight dibenzoyl peroxide (as a 75 percent water wet powder). The mixture was stirred for 4 hours in a bath having a temperature of 98° C. and then cooled to 40° C. The polymerizate beads were centrifuged off at this temperature, thoroughly washed with completely salt free water and dried in a fluidized bed drier at a supply air temperature of 60° C. There were obtained 1,565 grams of clear, essentially agglomerate free and readily pourable polymerizate beads having a statistical particle diameter $d'$ of 0.30 mm and a uniformity coefficient n of 4.

EXAMPLE 7

There were present in a 5 liter polymerization vessel equipped with stirrer, reflux condenser and thermometer a mixture of 3,100 grams of completely salt free water, 96 grams of a 10 percent aqueous polyacrylic acid solution having a dynamic viscosity of 300 mPas and 1.6 grams of di-n-butyl phosphate and the mixture heated to 70° C. There were then added with stirring 1,600 grams of a mixture of 30 parts by weight n-butyl acrylate, 70 parts by weight styrene and 1.5 parts by weight dibenzoyl peroxide (as a 75 percent water wet powder). The mixture was stirred for 4 hours in a bath having a temperature of 90° C. and then for 1 hour in a bath having a temperature of 98° C. and then cooled to 40° C. The polymerizate beads were centrifuged off at this temperature, thoroughly washed with completely salt free water and dried in a fluidized bed drier at a supply air temperature of 50° C. There were obtained 1,562 grams of clear, essentially agglomerate free and readily pourable polymerizate beads having a statistical particle diameter $d'$ of 0.42 and a uniformity coefficient n of 5.

EXAMPLE 8

There were present in a 5 liter polymerization vessel equipped with stirrer, reflux condenser, and thermometer a mixture of 3,100 grams of completely salt free water, 96 grams of a 10 percent aqueous polyacrylic acid solution having a dynamic viscosity of 300 mPas and 1.6 grams of mono-n-butyl phosphate and the mixture heated to 70° C. There were then added with stirring 1,600 grams of a mixture of 8 parts by weight 2-ethylhexyl acrylate, 2 parts by weight methacrylic acid, 10 parts by weight styrene, 80 parts by weight isobutyl methacrylate, 0.6 parts by weight n-dodecyl mercaptan and 1.0 part by weight dilauroyl peroxide. The mixture was stirred for 3 hours in a water bath having a temperature of 80° C. and then cooled to 30° C. The polymerizate was centrifuged off at this temperature, thoroughly washed with completely salt free water and dried in a fluidized bed drier at a supply air temperature of 50° C. There were obtained 1,578 grams of clear essentially agglomerate free and readily pourable polymerizate beads having a statistical particle diameter $d'$ of 0.45 mm and a uniformity coefficient $n$ of 4.5.

The entire disclosure of German priority application P 35035854.6 is hereby incorporated by reference.

What is claimed is:

1. In a process for the production of a suspension polymerizate by the polymerization of an ester of acrylic acid, an ester of methacrylic acid or a vinyl aromatic or a monomer mixture which predominantly consist of such monomers in aqueous suspension and in the presence of a homopolymerizate of acrylic acid or methacrylic acid or a copolymerizate which is derived from at least 50 weight percent of acrylic acid or methacrylic in the form of the free acid or its alkali metal or ammonium salt, the improvement comprising including in the polymerization mixture 0.004 to 0.2 weight percent, based on the water present in the polymerization system, of at least one mono or diester of phosphoric acid with an alkanol having 1 to 4 carbon atoms and including the step of recovering polymerizate beads having a statistical particle diameter of 0.30 to 0.80 mm.

2. A process according to claim 1 wherein there is polymerized an alkyl acrylate, an alkyl methacrylate, styrene or an alkyl styrene.

3. A process according to claim 1 wherein there is employed 0.02 to 0.08 weight percent of the ester of phosphoric acid.

4. A process according to claim 3 wherein the mono or diester of phosphoric acid is an ester with an alkanol having 2 to 4 carbon atoms.

5. A process according to claim 1 wherein the mono or diester of phosphoric acid is an ester with an alkanol having 2 to 4 carbon atoms.

6. In a process for the production of a suspension polymerizate by the polymerization of an ester of acrylic acid, an ester of methacrylic acid or a vinyl aromatic or a monomer mixture which predominantly consist of such monomers in aqueous suspension and in the presence of a homopolymerizate of acrylic acid or methacrylic acid or a copolymerizate which is derived from at least 50 weight percent of acrylic acid or methacrylic in the form of the free acid or its alkali metal or ammonium salt, the improvement comprising including in the polymerization mixture of 0.004 to 0.2 weight percent, based on the water present in the polymerization system, of at least one mono or diester of phosphoric acid with an alkanol having 4 carbon atoms.

7. A process according to claim 6 wherein there is employed 0.02 to 0.08 weight percent of the ester of phosphoric acid with an alkanol having 4 carbon atoms.

8. A process according to claim 7 wherein there is employed a mixture of 20 to 80 weight percent mono-n-butyl phosphate and 80 to 20 weight percent di-n-butyl phosphate.

9. A process according to claim 6 wherein there is employed a mixture of 20 to 80 weight percent mono-n-butyl phosphate and 80 to 20 weight percent di-n-butyl phosphate.

10. A process according to claim 1 wherein the mono or diester of phosphoric acid is an ester with an alkanol having 2 to 4 carbon atoms and the polymerizate beads have a statistical particle diameter of 0.40 to 0.80 mm.

* * * * *